Jan. 10, 1967 W. D. ZEITER 3,297,177
SILAGE HANDLING APPARATUS
Filed Jan. 25, 1965 6 Sheets-Sheet 1

Wayne D. Zeiter
INVENTOR.

BY Clarence A. O'Brien
and Harvey B. Jacobson
Attorneys

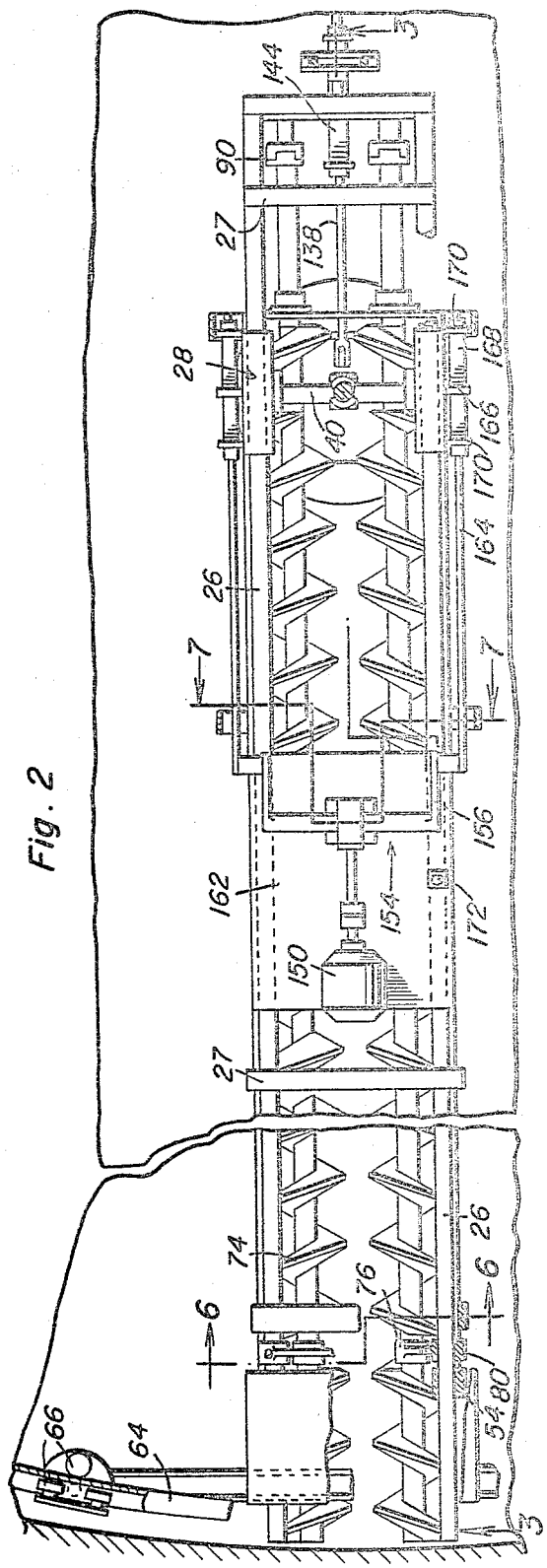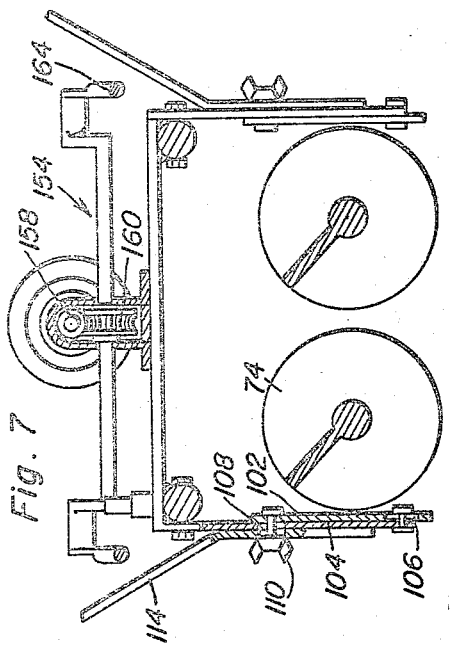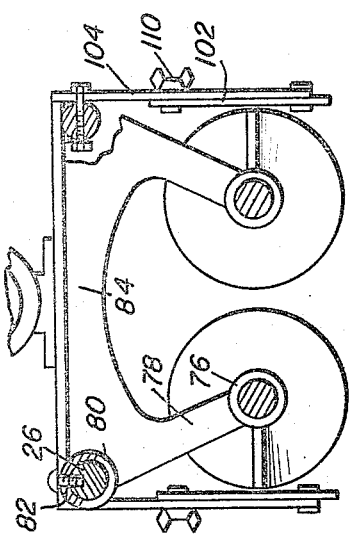

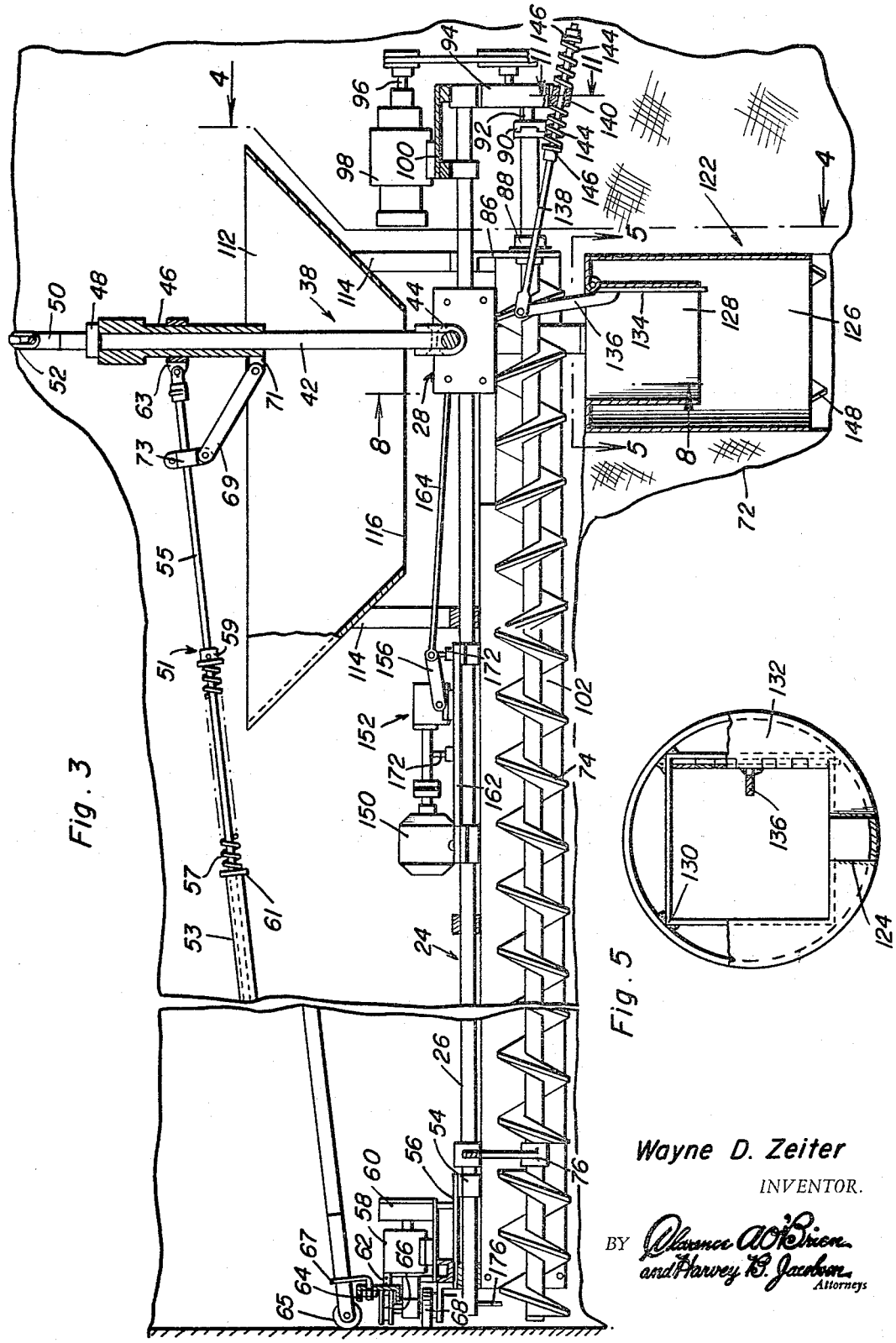

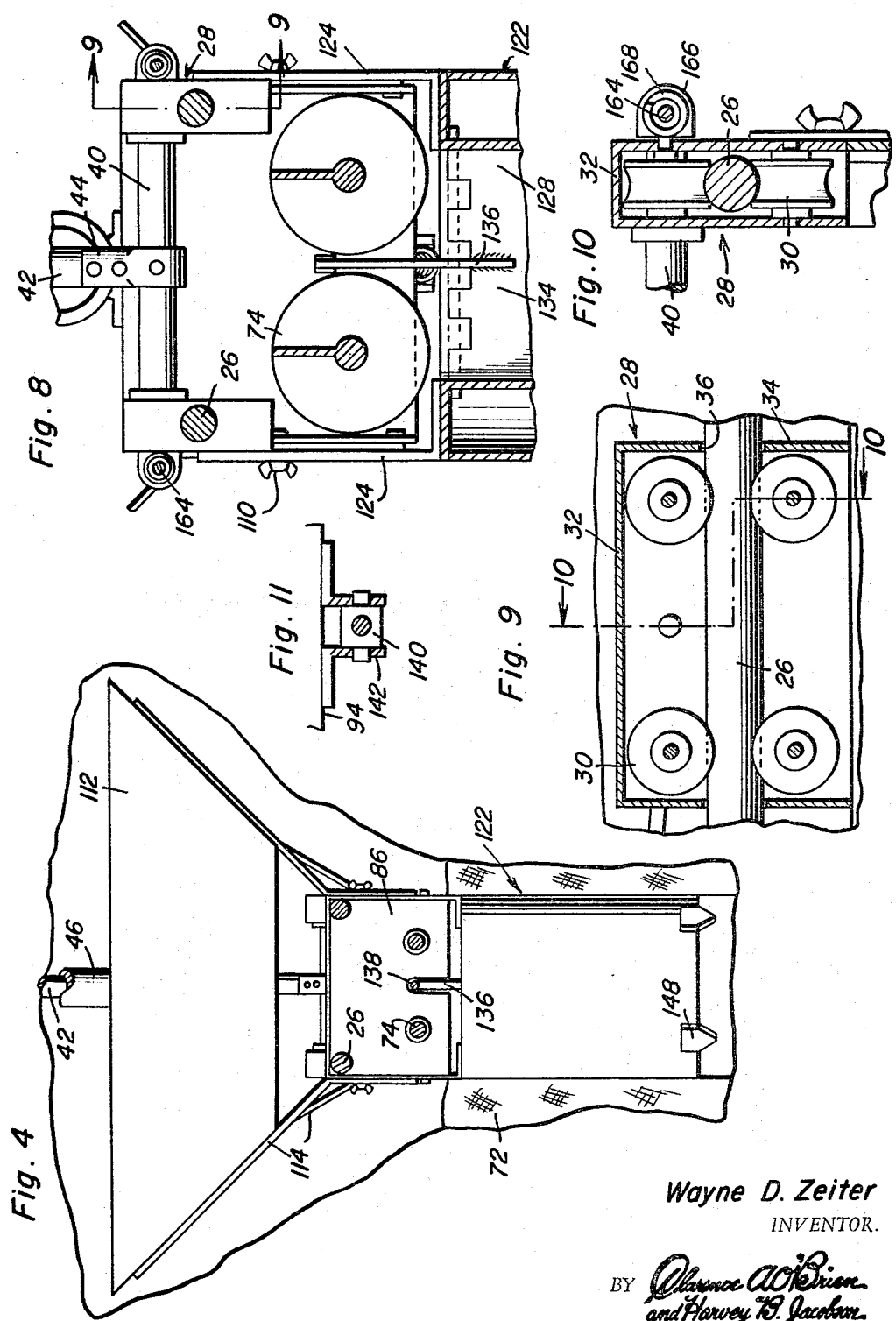

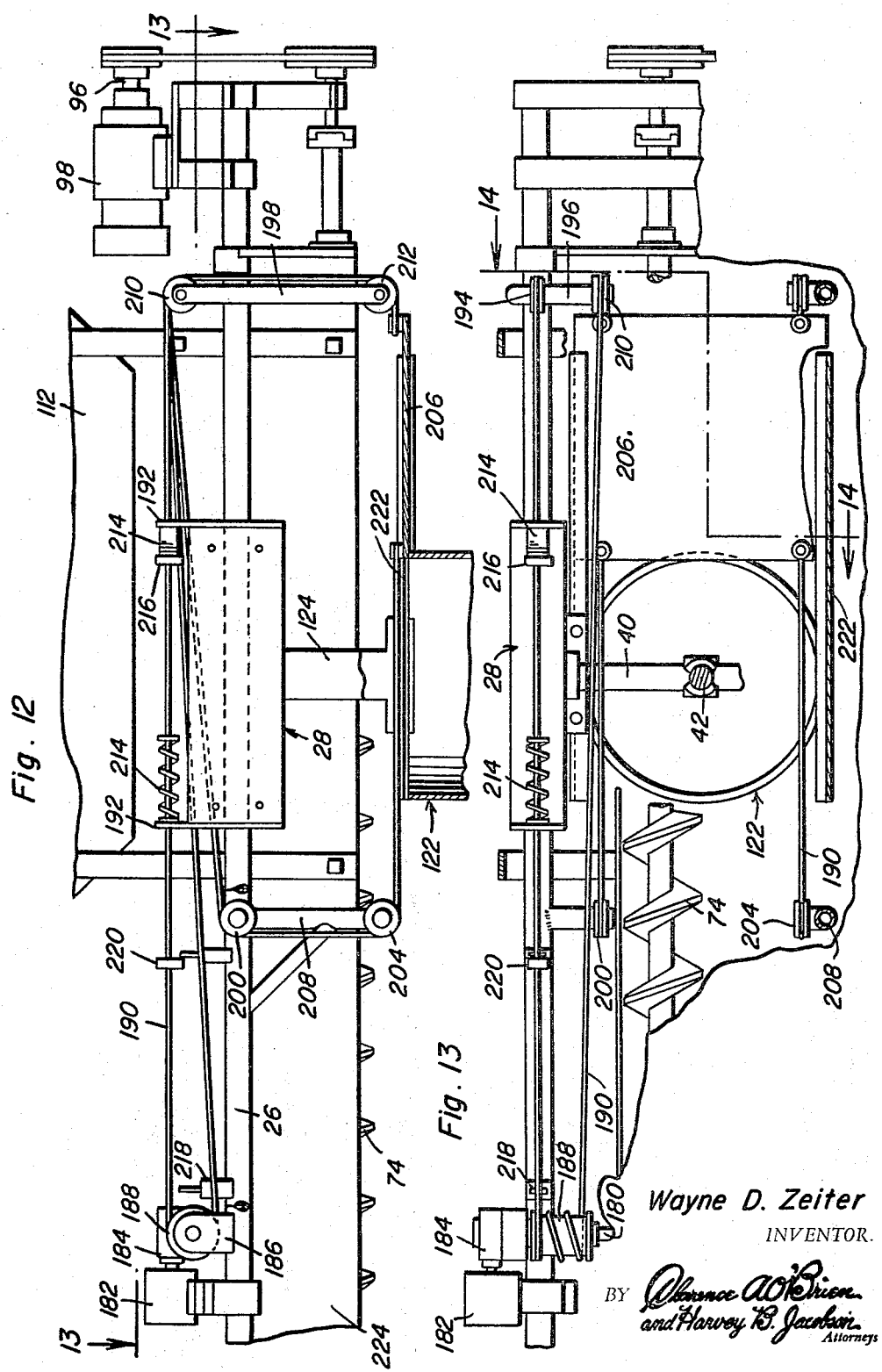

Jan. 10, 1967  W. D. ZEITER  3,297,177
SILAGE HANDLING APPARATUS
Filed Jan. 25, 1965  6 Sheets-Sheet 6
Fig. 14
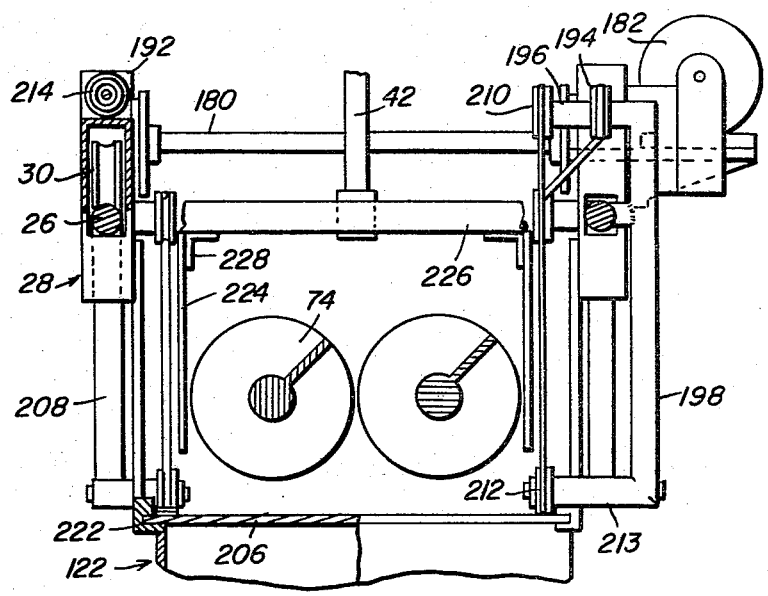
Fig. 15
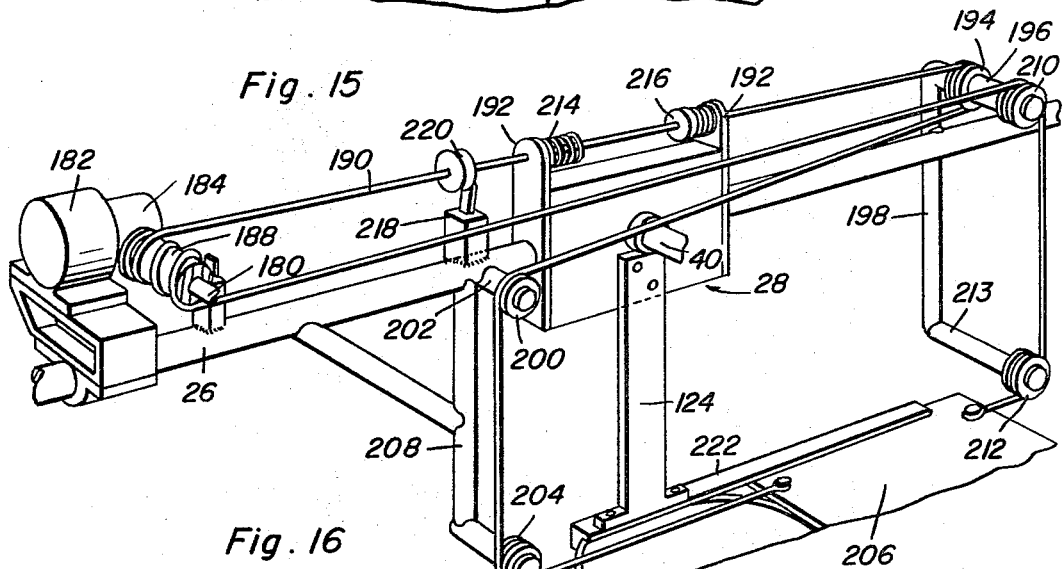
Fig. 16
Fig. 17
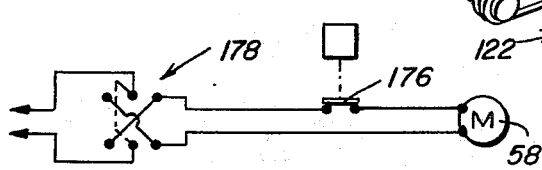
Wayne D. Zeiter
INVENTOR.

United States Patent Office 3,297,177
Patented Jan. 10, 1967

3,297,177
SILAGE HANDLING APPARATUS
Wayne D. Zeiter, R.R. 1, Bloomville, Ohio 44818
Filed Jan. 25, 1965, Ser. No. 427,563
16 Claims. (Cl. 214—17)

The present invention generally relates to silage handling apparatus, and is more particularly concerned with a silage handling device uniquely adapted to automatically load silage into and unload silage from silos.

One of the primary objects of the instant invention is to eliminate the particular manual operations now associated with central loading and unloading silage handling devices of the type which are mounted for vertical movement within silos.

The conventional silage handling apparatus, as exemplified by the patent to Hazen, 3,075,657, loads and packs silage into a silo by means of a radially extending auger conveyor which travels horizontally around the interior of the silo and is progressively raised vertically therein. During this loading operation, a tube or channel former is also raised so as to produce a central channel which substantially maintains its shape due to the packing of the silage. When it becomes necessary or desirable to unload the silage, or a portion thereof, the trough utilized in conjunction with the loading movement of the auger is manually removed, and a side panel or apron mounted in its place. In addition, the channel former or tube is also manually removed from below the conveying auger and mounted on the suspension system thereabove. At this point, the conveying auger can be reversed and the silage fed to the central passage for gravity discharge therethrough. Incidentally, in those conventional systems utilizing a pair of augers so as to convey the feed during both the loading and unloading operation, in order to switch from the loading to unloading operation, the augers have heretofore been manually switched so as to properly maintain movement of the silage therebetween. Accordingly, it is a highly significant object of the instant invention to provide a silage handling apparatus wherein all of the above manual steps are eliminated.

Likewise, it is a significant object of the instant invention to eliminate the time delay, which may run into several manhours, associated with the above manual switching of the handling apparatus from its loading to its unloading condition.

Furthermore, a significant object of the instant invention is to provide an apparatus whereby it is no longer necessary for one, and in most cases two men actually going into the silo so as to effect the conversion, this in itself eliminating the danger inherent in going into the more modern oxygen free type of silo which requires ventilation for a substantial length of time before it can safely be worked in.

Also, it is an object of the instant invention to provide a silage handling apparatus wherein the loading operation can be stopped and a predetermined amount of silage unloaded, as for example during feeding time, this stopping of the loading operation, for a short period of unloading, being highly impractical with the more conventional apparatus.

In addition, it is an object of the instant invention to provide for a unique auger conveyor unit wherein an efficient loading and unloading of the silage can be accomplished by merely reversing the direction of rotation of the augers themselves without requiring a physical displacement of the augers.

In conjunction with the above object, it is also an object of the instant invention to provide for the unloading of the silage directly through the channel former itself, the channel former incorporating a lid which can be automatically or manually opened and closed, preferably in conjunction with an axial movement of the conveying unit, this being done so as to effect a more efficient loading and unloading of the silage.

With regard to the channel former itself, it is an object of the instant invention to utilize the former in reshaping and more positively defining the center unloading passage as the apparatus is lowered during the unloading cycle.

Further, a significant object of the invention is to provide apparatus which can be adapted to any conventional center loading and unloading silage handling device so as to achieve the above objects and eliminate the manual operations.

Basically, the silo loader and unloader consists of a horizontally orientated conveying auger or pairs of augers suspended for vertical movement within a silo, the auger conveyor extending radially within the silo from approximately the center thereof to the side wall. A receiving hopper is positioned above the inner end of the auger conveyor to receive the silage directed into the silo from the upper end thereof through a conventional discharge spout associated with a lift tube and ensilage blower. The auger unit is mounted for travel in a circular path about the silo, rotating about the inner end thereof, as well as being capable of limited axial movement so as to either move the outer end thereof away from the silo wall during the loading operation, or move the outer end thereof close to the silo wall during the unloading operation so as to ensure a complete unloading of the silo. The augers themselves are capable of being driven in opposite directions with the feed being loaded or unloaded either by the augers themselves, or in conjunction with unique guide plates, no adjustment being needed in either case when switching from one cycle to another. Also, inasmuch as the silage is to be unloaded centrally through a vertical passage communicating with a discharge or drag conveyor located beneath the silo, a channel former is suspended below the inner end of the conveyor unit and moves vertically therewith during the loading of the silage so as to define, within the packed silage, a centrally located vertical passage. This channel former remains suspended below the conveyor unit during the unloading operation, and includes, about the lower edge thereof, knife-like blades which, in conjunction with the former itself, act so as to redefine and maintain the central passage as the handling apparatus is lowered. In addition, the channel former is provided with a lid removable automatically, preferably in response to movement of the conveyor unit axially to its unloading position, thereby opening a passage through the former itself in communication with the vertical discharge passage formed centrally within the silage. In this manner, the necessity of specifically removing the entire former is eliminated. The lid, of course, automatically closes upon a moving of the conveyor unit to its loading position. The movement of the various components are all to be automatically, and preferably electrically, controlled without requiring the actual presence of the user within the silo.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a view taken substantially upon a plane passing along line 2—2 in FIGURE 1;

FIGURE 3 is a cross-sectional view taken substantially upon a plane passing along line 3—3 in FIGURE 2;

FIGURE 4 is a cross-sectional view taken substantially upon a plane passing along line 4—4 in FIGURE 3;

FIGURE 5 is a cross-sectional view taken substantially upon a plane passing along the line 5—5 in FIGURE 3;

FIGURE 6 is an enlarged cross-sectional view taken substantially upon a plane passing along the line 6—6 in FIGURE 2;

FIGURE 7 is an enlarged cross-sectional view taken substantially upon a plane passing along the line 7—7 in FIGURE 2;

FIGURE 8 is an enlarged cross-sectional view taken substantially upon a plane passing along the line 8—8 in FIGURE 3;

FIGURE 9 is an enlarged cross-sectional view taken substantially upon a plane passing along the line 9—9 in FIGURE 8;

FIGURE 10 is a cross-sectional view taken substantially upon a plane passing along the line 10—10 in FIGURE 9;

FIGURE 11 is an enlarged cross-sectional view taken substantially upon a plane passing along the line 11—11 in FIGURE 3;

FIGURE 12 is a side elevational view of a portion of a modified form of the apparatus;

FIGURE 13 is a partial plan view taken substantially upon a plane passing along the line 13—13 in FIGURE 12;

FIGURE 14 is an enlarged cross-sectional view taken substantially upon a plane passing along the line 14—14 in FIGURE 12;

FIGURE 15 is a perspective view of a portion of the modified form of apparatus illustrated in FIGURE 12; and FIGURES 16 and 17 schematically illustrate two of the circuits utilized in the instant invention.

Figure 1:
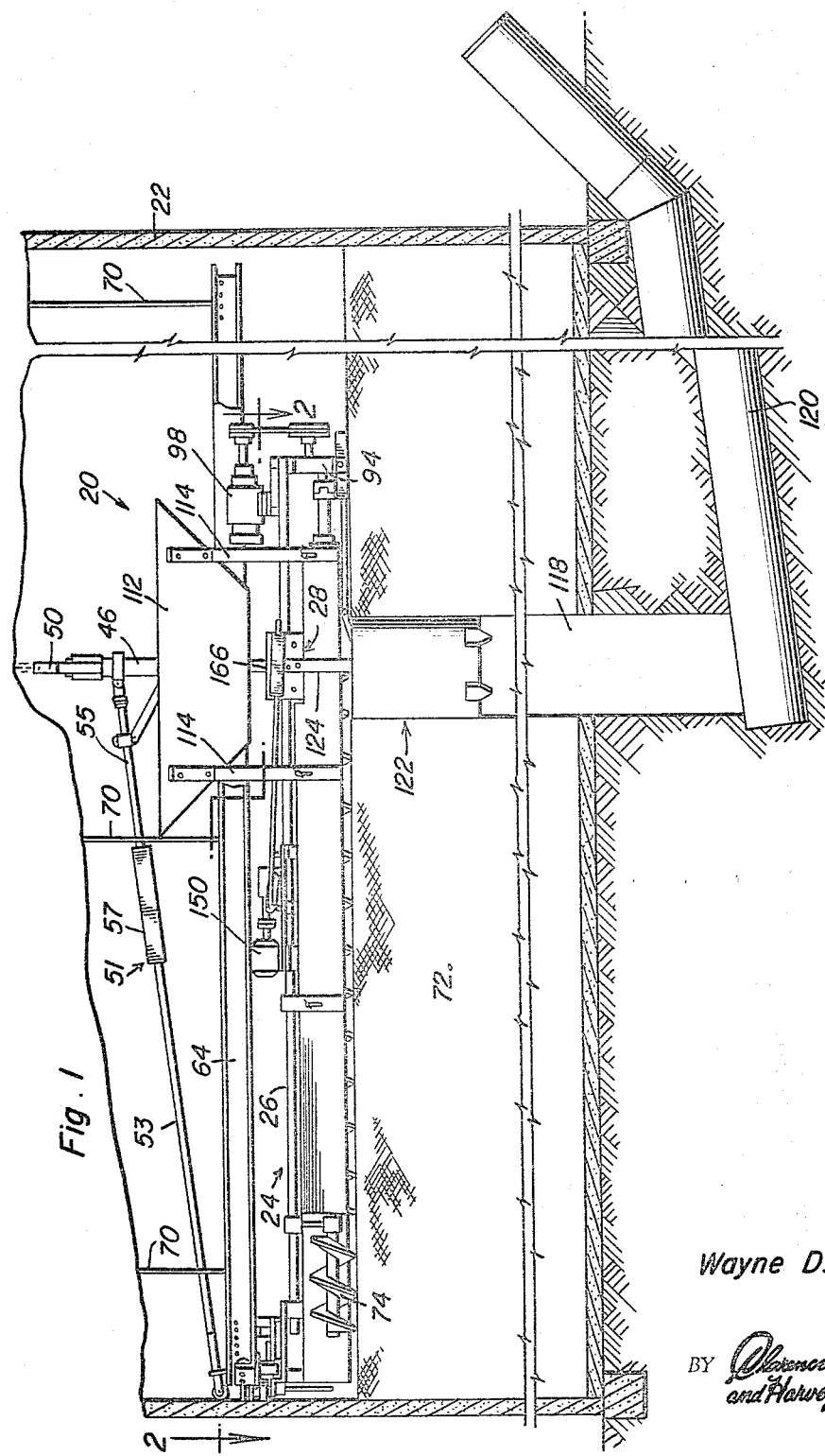
FIGURE 1 is a side elevational view of a silo loader and unloader having the innovations of the instant invention incorporated therein.

Referring now more specifically to the drawings, reference numeral 20 is used to generally indicate the silage handling apparatus or silo loader and unloader. This apparatus 20 is positioned horizontally within a conventional cylindrical silo 22 and extends radially therein from approximately the center of the silo to the wall thereof.

The apparatus 20 includes an enlongated mounting framework 24 comprising, in the illustrated embodiment, a pair of elongated spaced parallel support rods or members 26 rigidly interconnected by suitable cross members 27. The inner ends of the support members 26 are slidably supported for axial movement by a pair of journaling carriages or boxes 28, each box 28 including upper and lower pairs of rollers 30 rotatably mounted therein in vertically spaced relation to each other with the corresponding support rod or member 26 slidably received therebetween for movement therethrough. These journaling boxes or units 28, as will be appreciated from FIGURE 9, include closed tops and sides 32 and 34 so as to exclude, as much as possible, dust, dirt or silage from the journaling means therein. By the same token, the lower end of the box 28 is maintained open so as to provide for a dropping out of any foreign matter which might be brought into the box 28 by, for example, the support rod 26 moving therethrough. Incidentally, it will be noted that the end walls 34 of the box 28 have centrally located apertures 36 therein so as to allow passage of the support rod 26 therethrough.

The journaling units 28 are interconnected and supported by a hanger 38 in the form of an inverted T. The crossbar 40, of the hanger 38, extends between and is rigidly fixed to the inner sides of the units 28, as for example by welding. The stem 42 of the hanger 38 is fixed, as by means of a bolted connecting strap 44, to the center of the crossbar 40 and projects vertically thereabove for rotatable reception within an elongated sleeve 46. The upper end of the stem 42 is provided with an integral enlargement or head 48 which rests upon the enlarged upper end of the sleeve 46, thereby enabling a rotation of the stem, as well as the supported elements therebeneath, relative to the sleeve 46. The sleeve 46 is itself supported, through a suitable yoke 50 which engages the enlarged upper end of the sleeve 46 and projects above the stem head 48 without interfering with the rotation of the stem 42, by an overhead suspension cable 52 such as is normally utilized in center loading and unloading devices as exemplified by both the device in the Hazen patent and the Herd King silage handler manufactured by Clayton & Lambert Mfg. Co., Bucker, Kentucky. Further, a plurality of elongated stabilizing arms 51 may be provided, these arms 51 consisting of longitudinally aligned telescopically engaged sections 53 and 55 biased outwardly from each other by an elongated coiled compression spring 57 for intimate contact with the silo wall, the spring 57 being retained between a first stop 59 adjustably fixed to the smaller member 55, and a second stop 61 fixed to the received end of the larger member 53. The inner end of each of the stabilizing arms 51 is pivotally fixed, as at 63, to the sleeve 46, and includes, at the outer end thereof, a vertically orientated roller 65 for vertical travel on the silo wall during a vertical movement of the apparatus 20. It will be noted that the outer end of each of the stabilizing arms 51 is related to the traction or drive ring 64 by a U-shaped member 67 encircling the outer end of the arm 51 and having the opposite arms thereof fixed to the drive ring 64 immediately therebelow. In addition, in order to eliminate any tendency for the hanger moving slightly laterally during the operation of the device so as to result in an enlarged hole in the silage, this only occurring when the silage itself is extremely dry, the instant invention contemplates the provision of an auxiliary brace 69. This brace 69, one provided in conjunction with each stabilizing arm 51, is pivotally engaged, as at 71, to the sleeve 46, and adjustably clamped, as at 73, to the stabilizing arm 51, thereby substantially increasing the stability of the device so as to enable the formation of a more perfect hole or passage through the silage. As will be appreciated, vertical movement of the inner end of the device 20 is effected through the cable 52 in the conventional manner, and in conjunction with a simultaneous vertical movement of the outer end of the apparatus 20, as shall be described presently, so as to maintain the horizontal orientation of the apparatus.

The outer ends of the support rods 26 are mounted for axial or radial movement within the silo 22 by means of a pair of bearing sleeves 54 which are fixed to and depend from a support plate 56 which in turn mounts the motor 58, and drive sprocket 62. This last described unit is supported from the circular traction ring 64 by a plurality of rotatably mounted wheels or rollers 66 engaged with the flanges of the traction or drive ring 64. In addition, hard rubber wheels 68 are mounted for engagement with and travel along the silo wall itself. The traction ring 64 is, as is the case in the above noted conventional devices, suitably suspended by overhead cables 70 for vertical movement of the traction ring and the outer end of the frame 24 in conjunction with the hanger 38 and inner end of the frame 24.

The actual conveying of the silage 72 is effected by a pair of elongated parallel feed augers 74 positioned below and extending parallel to the framework support members 26. These auger assemblies 74 while rotatably mounted, are longitudinally fixed to the framework 24 for radial in and out movement therewith. This movement is highly desirable so as to, in loading the silo, position the outer ends of the augers 74 away from the silo wall, thereby preventing any blockage or jamming which might hinder operation of the device 20. By the same token, by moving the outer ends of the augers 74 close to the silo wall during the unloading cycle, a complete discharge of all of the silage 72 within the horizontal plane of the augers 74 is assured. The actual support of the augers 74 is effected by, adjacent the outer ends thereof, a pair of bearings 76 rotatably receiving the auger shafts. These bearings 76, referring specifically to FIGURE 6, are rigidly positioned by a pair of depending arms 78 which in turn are fixed, through collars 80, to the framework support members 26, bolt means 82 being utilized to lock the collars 80, and consequently arms 78 and bearing sleeve 76, in position. Further, in order to additionally stabilize the support members 26 at this point, an integrally formed transversely extending bracing portion 84 may be provided between the arms 78. The support of the inner end portions of the augers 74 is accomplished by means of a plate 86 suspended from the support members 26 and including bearing sleeves 88 set therein and rotatably receiving the auger shafts therethrough.

In order to effect a reversible driving of augers 74, it will be noted that the shafts thereof have been extended inwardly from the sleeves 88 for coupling engagement, as indicated at 90, with the output shafts 92 of a gear box 94 which is in turn belt driven from the output shaft 96 of a reversible motor 98 which is mounted thereabove on a platform 100 fixed to and between the support members 26.

The actual conveying unit may include, in addition to the augers 74, a pair of vertical side panels or sideboards 102 positioned longitudinally along the outer sides of the augers 74 for substantially the full length of the flight portion of the augers 74, that is approximately from the inner mounting plate 86 and bearing sleeves 88 to a point just short of the outer ends of the augers 74. These sideboards 102 are vertically orientated and suspended from the pipe-like support members 26 by a plurality of straps 104 fixed along these members 26 and depending therefrom. With reference to FIGURE 7 it will be noted that the sideboards 102 are bolted to the supporting straps 104 and vertically adjustable therealong, this adjustment being accommodated by corresponding bolt receiving grooves 106 and 108 in the sideboards or plates 102 and the suporting straps 104. In this manner, the vertical position of the sideboards 102 relative to the augers 74 can be adjusted prior to a locking of the plates 102 in position by suitable bolt means 110. As will be appreciated, the sideboards 102 are planar and laterally orientated so as to completely expose the lower portions of the augers 74. These sideboards 102, which incidentally can be permanently mounted if so desired, operate in conjunction with the augers 74 so as to guide the silage during the radial loading of the silage from the inner end of the device 20, this being accomplished by rotating the augers 74 outwardly so as to move the silage along the outer portions of the augers 74 and along the sideboards 102. The unloading of the silage from the silo 22 is to be accomplished by rotating the augers 74 in the opposite direction so as to move the silage 72 inwardly to the center of the silo between the augers 74. Thus, by the provision of the two planar sideboards or guide plates 102, it will be appreciated that both a loading and unloading of the silage can be achieved by merely reversing the direction of rotation of the auger 74, it no longer being necessary to either provide interchangeable troughs or guides, or physically remount the augers 74, as has heretofore been done and such as has necessarily involved at least two men entering the silo itself so as to readjust the apparatus, this in itself involving several man hours.

Incidentally, while the use of the pair of sideboards 102 presents specific advantages as compared with previously used guide means which had to be changed for each cycle, it has also been found that the augers 74 will, in the absence of any boards whatsoever, still move silage along their outsides. This is possible in that the silage will initially build up to about the center of the augers with additional silage following the augers to the outer end of the silo. The only significant difference resides in the producing, in each instant, of a slightly deeper fill.

As will be appreciated from the foregoing, the actual loading of the silage 72 is to be initiated from the inner ends of the augers 74 with the silage being distributed radially outward in a sweeping pattern about the interior of the silo. Accordingly, an enlarged funneling hopper 112 is mounted on the supporting framework 24 by means of a plurality of vertically extending legs 114, the hopper 112 being orientated vertically above the inner portion of the auger flights. As will best be appreciated from FIGURE 3, the hanger stem 42 projects directly through the hopper 112 with the lower discharge end 116 of the hopper 112 being of a size so as to allow the aforementioned radial movement of the framework 24 without interference with the stem 42, the hopper 112 of course moving with the framework 24 while lateral movement of the stem 42 is prevented as shall be explained presently. The silage 72 is fed into the hopper 112 from a suitable blower connected discharge pipe directed thereto from the upper end of the silo 22 with the hopper 112 directing the silage to the inner or receiving ends of the augers 74 for a radial conveying of the silage into the silo in an evenly distributed and packed condition, this loading movement of the silage 72 being conducted along the outer portions of the auger 74.

The silage 72 is to be discharged or unloaded by the same conveying unit which effects the loading thereof. The silage 72 is directed through an elongated passage or channel 118 formed generally coaxially with the silo 22 and in alignment with the inner ends of the auger flights, this passage or channel 118 communicating with a discharge or bottom unloading conveyor means 120 extending to the exterior of the silo 22 from silage receiving communication with the bottom of the channel or passage 18. In order to form this silage passage 118, which incidently is substantially self-sustaining due to the packed nature of the silage 72, a channel former 122 is suspended below the inner ends of the augers 74 by means of a pair of depending support arms 124 welded to the top of the channel former 122 at diametrically opposite points and extending vertically thereabove for fixed engagement with the journaling units or carriages 28. As will be appreciated, these support arms 124 are located laterally outward of the augers 74 so as to in no way interfere with the axial movement thereof.

The channel former 122 consists of a vertically elongated hollow cylinder or tube 126 having, in the preferred embodiment, a rectangular flue 128 located concentrically therein and projecting downwardly from the upper end of the tube 126 for a distance less than the full height of the tube 126. The rectangular flue 128, as will be appreciated from FIGURES 3 and 5, has the vertical corners 130 thereof welded to the interior of the tube 126 with a top plate or plates 132 filling that portion of the upper end of the tube 126 outward of the rectangular flue. The open upper end of the flue 128 is to be selectively closed or sealed by a lid or closure 134 hingedly mounted along one edge thereof for downward opening movement into the flue 128 parallel and against one side thereof. The actual opening and closing of the lid 134 is to be in response to the axial movement of the frame 24 and is effected by an elongated lever 136 rigid with the top of the lid 134 and projecting upwardly and rearwardly therefrom. The outer end of the lever 136 is pivotally connected to an elongated link or control arm 138 which projects therefrom at an angle through a pivotally mounted bearing block 140. The link 138 is slidably received through the bearing block 140 which is in turn mounted on the inner end of the framework in any suitable manner so as to depend therebelow. As illustrated, the bearing block 140 has been pivotally mounted between a pair of depending ears 142 welded to the bottom of the gear box 94. A pair of compression springs 144 are received on the control arm 138 on each side of the bearing block 140 and are retained thereagainst by adjustable stops 146. In this manner, it will be appreciated that as the framework 24 moves axially from its inner position, as shown in FIGURE 1, to its outer position, as shown in FIGURE 3, the bearing block 140 is carried along and exerts, through the shock absorbing compression spring 144, a force on the stop 146 and consequently the control arm 138, this force being transmitted to the lever 136 for effecting a downward opening of the lid 134. Conversely, as the framework 24 moves to its inner position, the bearing block 140 moving along therewith effects a closing of the lid 134 through the control arm 138 and lever 136. In its closed condition, the channel former 122 will consist basically of a hollow tube having a closed top and an open bottom, and as such, function generally in the manner of a conventional channel former. However, in unloading, the channel former of the instant invention, contrary to conventional formers, is not removed from the channel or passage 118 formed thereby, but on the contrary, the top or lid 134 is opened so as to enable a feeding of the silage 72 directly through the passage formed by the now open tube 126 which of course communicates with the passage 118 through the silage 72. The substantial savings in time and effort resulting from an elimination of the necessity of physically removing the channel former will be appreciated.

Further, the channel former 122 rotates about its vertical axis as the entire apparatus 20 is lowered during the unloading operation. As such, the former 122 acts so as to redefine and maintain the upper inlet end of the passage 118 as the silage is being introduced thereto by and between the rotating augers 74 which are in turn sweeping about the interior of the silo 22. In conjunction with this redefining of the passage or channel 118 through the silage 72, it will be noted that a plurality of cutters or shaping blades 148 are fixed peripherally to the exterior of the tube 126 and depend from the open lower end thereof.

The channel former 122, being embedded within the packed silage 72, in addition to stabilizing itself against lateral movement, also maintains the central vertical position of the journaling units 28 and hanger structure 38 suspending the entire device 20, while allowing for the radial or axial movement of the framework 24 and augers 74 relative thereto. This radial or axial movement of the framework 24 is automatically effected through a reversible motor 150 which drives, through a suitable worm gear unit 152, an elongated crank shaft 154 having a throw or crank 156 at each end thereof, the worm gear unit 152 including a drive gear 158 coupled to the drive shaft of the motor 150, and a driven gear 160 fixed to the crankshaft 154. This above described unit is mounted upon an enlarged support platform 162 fixed to the support rods 26 and spanning the distance therebetween, this platform 162 of course additionally bracing the support members 126 to provide for a more stable support framework 24. Each of the cranks 156 is pivotally engaged with one end of an elongated control arm 164 with the control arm 164 having the opposite end portion thereof slidably received through a bearing collar 166 and pivotally mounted on the corresponding journaling unit 28. Shock absorbing compression springs 168 are mounted on each control arm 164 and engaged with opposite sides of the corresponding bearing collar 166 with stops 170 fixed to the control arms 164 and engaged with the opposite ends of the corresponding compression springs 168. In this manner, it will be appreceiated that the initial pull or push on the arms 164 will effect a sliding movement of the framework 24, and the various elements mounted thereon, relative to the journaling units 28 which are stabilized by the channel former 122 embedded within the silage 72. Any sudden forces or shocks will of course be absorbed by the compression springs 168 so as to avoid damage to the apparatus 20. This axial movement of the framework 24 is to be limited between a predetermined inner and outer position. As such, a pair of limit switches 172 are provided on the framework for engagement by one of the cranks 156 at points corresponding to the opposite limits of movement of the framework 24. These limits or limit switches 172 will of course automatically de-energize the centrally located reversible motor 150. This is schematically shown in FIGURE 18 in conjunction with a manual double throw, double pole switch 176 for reversing the motor 150.

Accordingly, in moving from the unloading position of FIGURE 3 to the loading position of FIGURE 1, the motor 150 is activated so as to exert a pull on the journaling units 28 through the control arms 164 so as to move the framework 24, along with the augers 74 and the other elements mounted thereon, radially inward away from the inner wall of the silo 22, this movement being automatically stopped by the crank 156 contacting the outermost limit switch 172. Also, as will be appreciated from the above description, this radially inward movement of the framework 24 effects, through the control arm 138, a closing of the channel former lid 134. After the unit 20 has been set in its loading position, the augers 74 are activated so as to convey the silage 72, introduced through the hopper 112, radially outward. As the silage 72 is fed radially outward from the center of the silo 22, it is evenly distributed along the length of the augers 74 with the silage 72, upon approaching the silo wall, pressing against a pressure switch 176 operatively associated with the motor 58 and depending therefrom into the path of the silage being moved by the augers 74. This switch 176 activates the motor 58 so as to drive the framework 24 and augers 74 a predetermined distance along a rotational path about the traction or drive ring 64, thus ensuring an equal distribution of the silage 72 completely about the interior of the silo 22, in an automatic manner, upon an initial activation of the motor 58 from a suitable double throw, double pole switch 178. The automatic rotational sweeping of the conveying unit upon engagement of the silage with the pressure switch 176 of course avoids any danger of a clogging of the unit. The particular details of the pressure switch 176 have not been illustrated inasmuch as such are conventional. The circuit for motor 58 is broadly schematically illustrated in FIGURE 17.

Incidentally, while the means (motor 150, etc.) for automatically effecting an opening and closing of the channel former lid 134, and a corresponding radial movement of the augers, has been specifically detailed, attention is directed to the fact that the instant invention also contemplates the use of a manual means for effecting the opening and closing of the lid 134. For example, a crank handle can be provided for a manual rotating of the crankshaft 154 in lieu of the motor 150. It will of course be appreciated that the significant advantages in being able to unload directly through the channel former are still present.

Referring now specifically to FIGURES 12-15, it will be noted that a modified means for radially moving the frame and conveying unit, and closing and opening the channel former 122, has been illustrated therein. This system includes a transversely extending shaft 180, either centrally driven in the same manner as shaft 154 by means of the worm gear unit 152, or driven from one end thereof by a motor 182 and gear unit 184 mounted directly on one of the frame support members 26. The opposite end of the shaft can be rotatably supported by an upwardly projecting short bearing support 186 fixed to the second member 26. A cable drum 188 is fixed adjacent each end of the shaft 180 and rotatable therewith. Each of the drums 188 has an elongated cable 190 coiled several times thereabout and extending therefrom, in one direction, through a pair of upwardly projecting ears 192 on the corresponding journaling unit 28 and to a second pulley 194 rotatably mounted on a horizontal shaft 196 generally in longitudinal alignment with the ears 192. The shaft 196, which may extend across both support members 26, has at least one end thereof fixed to a vertical standard 198 rigid with and located laterally outward of the corresponding member 26. This standard projects both above the member 26 to approximately the height of the ears 192, and below the member 26 to approximately the top of the channel former 122. From the pulley 194, the first end of the cable 190 extends back past the journaling unit 28 to and around the pulley 200 rotatably mounted on a horizontal stub shaft 202 fixed to and projecting inwardly from the corresponding support member 26. Next, the first end extends vertically down to and around the pulley 204, this pulley 204 being mounted below the corresponding member 26, by a depending standard 208, in substantial alignment with the removable lid 206 on the channel former 122 with the extreme first end of the cable 190 being secured to the removable lid 206 adjacent the rear edge thereof. The opposite end of the cable 190 extends horizontally from the driven drum 188 to and around a pulley 210 also rotatably mounted on the shaft 196. This second end of the cable 190 extends from the pulley 210 vertically down to and around the pulley 212 rotatably mounted on the shaft 213 which is in turn rigidly fixed to the lower end of the standard 198. Finally, the extreme second end is fixed to the opposite edge of the lid 206 in a suitable manner.

It will be noted that a pair of spaced elongated shock absorbing coiled compression springs 214 are mounted on each cable 190 between the ears 192, one adjacent each ear. An abutment block 216 is fixed to the corresponding cable 190 between the inner ends of the springs 214 and is selectively engaged with one or the other of the springs 214 whereby a pull on the cables 190 will, through the appropriate spring 214 and its companion ear 192, effect a push on the journaling units 28 and a corresponding movement of the framework, the lateral position of the journaling units 28 of course being fixed through their rigid engagement with the channel former 122 embedded within the silage. As was the case with the form of the device illustrated in FIGURES 1–11, limit switches 218 are provided for automatically limiting the axial movement of the framework. The particular limit switches 218 are mounted on one of the supporting members 26 to one side of the journaling unit 28 for engagement by a stop block 220. With regard to the shock absorbing springs 214, it should be appreciated that these springs are significant as providing means for compensating for any sudden shock which might be introduced into the system by, for example, a momentary jamming of the augers 74 on a plug of silage. The two cables 190 are of course tensioned between the opposite ends of the former lid 206 and wound on the drums 188 so as to be positively and consistently driven thereby, the lid 206 being so orientated so as to move between a first position completely closing the upper end of the channel former 122 in response to a movement of the conveying unit to a loading position, and a second position completely removed from the upper end of the channel former 122 when the conveying unit is moved to an unloading position.

In the modification of FIGURES 12–15, it will be noted that no central flue is provided in the channel former 122, the lid 206 closing and opening the entire upper end of the former 122 and riding in opposed guide channels 222 fixed parallel to each other and tangentially to the upper end of the channel former. Such an arrangement will also of course require a slight modification of the support arms 124 used to rigidly position the channel former 122 beneath the journaling units 28 and the inner ends of the augers 74. Finally, if used, the guide boards 224 are located laterally outward from each auger 74 and can be permanently fixed to rigid cross braces 226 extending between the parallel support members 26 by mounting brackets 228, or any other suitable means. These guide or side boards 224, aside from not being vertically adjustable, function in the same manner as the first described side boards and leave the entire lower portions of the augers 74 exposed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A silage handler comprising horizontal conveying means, a channel former suspended from the handler, said handler and former being positionable in a silo for concurrent raising and lowering, said former having a substantially vertical passage therethrough, an openable closure for said passage, means for opening the passage closure after the silo has been filled so as to open the passage through said former, and means for driving the conveying means to cut silage from the surface of the silage and feed it through the former and the vertical channel in the silage below the former formed by the former.

2. The device of claim 1 including depending shaping blades fixed to the lower end of the former peripherally thereabout.

3. The device of claim 2 including a central flue in said former for directing the silage therethrough.

4. The device of claim 1 wherein said conveying means comprises at least one elongated conveying auger, said means for driving the conveying means including means for selectively rotating said auger in opposite directions, and silage guiding means positioned longitudinally along both sides of said auger for cooperation therewith so as to effect a movement of silage in either direction along said auger upon a rotation of said auger, said silage guiding means having laterally spaced lower edges so as to expose the lower longitudinal portion of the auger therebetween for contact with the surface of the silage.

5. Silage handling apparatus comprising reversible horizontal conveyor means disposed substantially radially in a silo, said conveyor means being radially adjustable in the silo, a channel former suspended beneath said conveyor means and in substantial alignment with the inner end thereof, said channel former having a downwardly opening hollow interior, an openable closure on the upper end of the former for selectively providing, in conjunction with the hollow interior and open lower end, a passage vertically through the former, and means for automatically opening and closing the closure in response to a radial adjustment of the conveyor means.

6. Silage loading and unloading apparatus comprising a horizontal generally circular traction ring, an elongated frame extending radially inward from said ring to approximately the center thereof, means supporting the inner end of the frame for rotational and radial movement, means mounting the outer end of the frame on the ring for movement therealong and radially thereof, reversibly driven auger conveyor means suspended from said frame and movable therewith, a channel former mounted below the inner end of the conveyor means, said frame and conveyor means being radially movable relative to said channel former, said channel former having a vertical passage therethrough, and movable closure means for selectively closing the vertical passage through said former, and means engaged between said frame and said closure means for effecting a movement of the closure means in response to a radial movement of the frame.

7. The device of claim 6 wherein radially inward movement of said frame produces a closing movement of the closure means, and radially outward movement of said frame produces an opening movement of the closure means.

8. The device of claim 7 wherein the means supporting the inner end of the frame comprises a hanger adapted to be suspended from an overhead support, and frame journaling means fixed to said hanger and slidably receiving a portion of the frame therein.

9. The device of claim 8 wherein said frame journaling means includes upper and lower rollers receiving the frame portion therebetween.

10. The device of claim 7 wherein radial movement of the frame and conveyor is effected by an elongated link, one end of said link being pivotally fixed, through shock compensating means, to the means supporting the inner end of the frame, a motor mounted on said frame, and means engaged between the motor and other end of the link for effecting a selective extension and retraction thereof, and consequently a radial movement of the frame relative to the means supporting the inner end of the frame.

11. The device of claim 7 wherein movement of the frame and movement of the closure means is effected by at least one elongated tensioned cable fixed to the means supporting the inner end of the frame, said closure means comprising a lid laterally slidable relative to the former, said cable being fixed to opposite ends of the lid, and a reversible driven cable drum drivingly receiving a portion of said cable, said drum being rotatably mounted on said frame.

12. The device of claim 11 including a plurality of rotatably mounted pulleys receiving the cable thereover for effecting a movement of the frame and closure means in opposite longitudinal directions relative to each other.

13. The device of claim 8 including a pair of generally flat guide boards mounted on the frame and orientated on opposite sides of the auger conveyor means and parallel thereto for cooperation therewith in conveying the silage, said guide boards having laterally spaced lower edges so as to expose the lower portion of the auger conveyor means therebetween for contact with the surface of the silage, said board being mounted during both the loading and unloading cycle of the apparatus.

14. For use in conjunction with a silage handling apparatus including reversible horizontal conveyor means disposed substantially radially in a silo, a cylindrical channel former adapted to be suspended beneath the conveyor means in substantial alignment with the inner end thereof, said channel former having a hollow interior, an open lower end communicating with the hollow interior, an open upper end communicating with the hollow interior, a closure for said open end, and means for selectively opening and closing said closure for the selective provision of a passage completely through said former.

15. The device of claim 1 including means for adjustably positioning said conveying means in the silo, said means for opening the closure passage being activated in response to an adjustable positioning of said conveying means.

16. A silage handler comprising a substantially horizontal silage conveying means, a channel former suspended from the handler, said handler and former being positionable in a silo for a simultaneous raising and lowering thereof, means for selectively forming a passage through said former subsequent to the introduction of silage into the silo, and means for driving the conveying means for receiving silage and feeding it through the former and the vertical channel in the silage below the former formed by the former.

References Cited by the Examiner
UNITED STATES PATENTS 2,671,696  3/1954  McLean.
3,075,657  1/1963  Hazen _____ 214—17

GERALD M. FORLENZA, *Primary Examiner.*

ROBERT G. SHERIDAN, *Examiner.*